United States Patent
Harrison et al.

(10) Patent No.: US 10,100,629 B2
(45) Date of Patent: Oct. 16, 2018

(54) SYSTEMS AND METHODS FOR PROVIDING END-TO-END MONITORING AND/OR CONTROL OF REMOTE OIL AND GAS PRODUCTION ASSETS

(71) Applicant: WellAware Holdings, Inc., San Antonio, TX (US)

(72) Inventors: Matthew Harrison, San Antonio, TX (US); William Cameron Powell, San Antonio, TX (US); Stephen Trey Moore, San Antonio, TX (US)

(73) Assignee: WellAware Holdings, Inc., San Antonio, TX (US)

( * ) Notice: Subject to any disclaimer, the term of this patent is extended or adjusted under 35 U.S.C. 154(b) by 248 days.

(21) Appl. No.: 14/770,917

(22) PCT Filed: Mar. 12, 2014

(86) PCT No.: PCT/US2014/024034
§ 371 (c)(1),
(2) Date: Aug. 27, 2015

(87) PCT Pub. No.: WO2014/150706
PCT Pub. Date: Sep. 25, 2014

(65) Prior Publication Data
US 2016/0010445 A1  Jan. 14, 2016

Related U.S. Application Data

(60) Provisional application No. 61/790,473, filed on Mar. 15, 2013.

(51) Int. Cl.
*G05B 19/40* (2006.01)
*E21B 47/00* (2012.01)
(Continued)

(52) U.S. Cl.
CPC ............ *E21B 47/00* (2013.01); *G05B 19/406* (2013.01); *G06Q 10/06* (2013.01); *H04L 67/12* (2013.01);
(Continued)

(58) Field of Classification Search
CPC ....................................................... H04L 67/12
See application file for complete search history.

(56) References Cited

U.S. PATENT DOCUMENTS

| | | | | |
|---|---|---|---|---|
| 5,666,648 A | * | 9/1997 | Stuart | H04B 7/18576 342/352 |
| 6,014,089 A | * | 1/2000 | Tracy | G01D 4/006 340/870.02 |

(Continued)

FOREIGN PATENT DOCUMENTS

| WO | WO200236368 A1 | 5/2002 |
|---|---|---|
| WO | WO2011141911 A1 | 11/2011 |

OTHER PUBLICATIONS

Notification of Transmittal of the International Search Report and the Written Opinion of the International Searching Authority for PCT/US14/24034 dated Jul. 21, 2014, 10 pages.

*Primary Examiner* — Robert Cassity
*Assistant Examiner* — Gary Collins
(74) *Attorney, Agent, or Firm* — Fish & Richardson P.C.

(57) ABSTRACT

Implementations are directed to remote data aggregation, data management, and data visualization of field data from remote field site locations. Actions can include generating, by one or more sensors, the field data, each sensor of the one or more sensors being responsive to field site activity, transmitting, through a regional network, the field data to a back-end system, processing, by the back-end system, the field data to provide visualization data, transmitting the visualization data to one or more mobile computing devices, and providing a computer-executable application for execution on a mobile computing device, the computer-executable application processing the visualization data to provide data visualizations.

20 Claims, 6 Drawing Sheets

(51) Int. Cl.
  *H04L 29/08* (2006.01)
  *G06Q 10/06* (2012.01)
  *G05B 19/406* (2006.01)
  *H04W 4/38* (2018.01)
  *H04W 4/00* (2018.01)

(52) U.S. Cl.
  CPC ... *G05B 2219/40573* (2013.01); *H04W 4/006* (2013.01); *H04W 4/38* (2018.02)

(56) References Cited

U.S. PATENT DOCUMENTS

| | | | | |
|---|---|---|---|---|
| 6,967,589 | B1* | 11/2005 | Peters | E21B 47/00 166/250.15 |
| 8,024,666 | B2* | 9/2011 | Thompson | G06Q 10/00 345/440 |
| 2001/0040509 | A1* | 11/2001 | Dungan | G01N 33/0075 340/632 |
| 2002/0169645 | A1* | 11/2002 | Aronstam | G06Q 10/06 702/188 |
| 2008/0208475 | A1* | 8/2008 | Karr | E21B 47/00 702/6 |
| 2009/0058674 | A1* | 3/2009 | Papouras | E21B 47/00 340/853.2 |
| 2009/0153354 | A1 | 6/2009 | Daussin | |
| 2009/0313576 | A1* | 12/2009 | Neumann | G06T 11/206 715/783 |
| 2011/0031015 | A1* | 2/2011 | Downton | E21B 47/12 175/27 |
| 2012/0026002 | A1* | 2/2012 | Vu | E21B 47/00 340/854.6 |
| 2012/0221379 | A1 | 8/2012 | Martinez | |
| 2012/0274664 | A1* | 11/2012 | Fagnou | G06F 3/04855 345/660 |
| 2013/0254416 | A1* | 9/2013 | Abraham | H04L 67/2823 709/230 |

* cited by examiner

SYSTEMS AND METHODS FOR PROVIDING END-TO-END MONITORING AND/OR CONTROL OF REMOTE OIL AND GAS PRODUCTION ASSETS

CROSS-REFERENCE TO RELATED APPLICATIONS

This application is a national stage application under 35 U.S.C. § 371 of International Patent Application No. PCT/US2014/024034, filed on Mar. 12, 2014, which claims priority from U.S. Provisional Application No. 61/790,473, filed on Mar. 15, 2013, each of these applications are incorporated by reference in their entirety.

BACKGROUND

Oil and gas production assets are often distributed across remote locations. For example, well-sites can be remote from convention communications equipment making the retrieval of well-site data difficult and unreliable. Some locations can be so remote, that periodic on-site visits are required to manually or semi-manually retrieve data.

SUMMARY

Implementations of the present disclosure include computer-implemented methods for remote data aggregation, data management, data visualization of natural resource data (e.g., oil data and/or gas data) from remote production assets, as well as control of remote production assets. Example production assets can include well site locations, pipelines, refineries, custody transfers, and the like. In some implementations, the following example functionality is provided: mobile monitoring and control of remote assets, remote monitoring of production, remote spill/leak detection, remote well shut in, remote measurement of various elements including, but not limited to, hydrocarbon production, salt water production, fresh water production/consumption, tank level monitoring, hazardous gas detection, regulated gas detection, pipeline integrity monitoring, remote pipeline shut in and control, block valve control, production optimization through closed loop control, hydrocarbon reservoir optimization through closed loop control, pressure monitoring, temperature monitoring, air quality monitoring, asset tracking, personnel access control, monitoring and control of removal of hydrocarbons, and/or detection of equipment failure and remote restart capabilities.

In accordance with implementations of the present disclosure, a dedicated remote monitoring wireless network is deployed over oil and gas assets. Further, remote monitoring computing devices, intelligent sensing devices, aggregation computing devices in the field, and computer-executable programs are provided. In some examples, computer-executable programs are provided to perform functionality discussed herein (algorithms) in the field. Further, radio or transmitting devices are provided to send encoded computer information over an upper-level network (e.g., the Internet), and a system of computer storage devices are provided to store data received from the remote locations (e.g., production assets). In some implementations, computer storage devices are provided to store data in a physical or remote premise, computer programs and algorithms are provided to analyze the data, and to send or transmit the data to any display terminal (e.g., fixed and/or mobile). In accordance with implementations of the present disclosure, native software programs that reside on mobile devices (e.g., are installed on and are executed by mobile devices) are provided to display data. In some examples, the native software programs provided on mobile computing devices provide functionality for data processing and computation and user input of information. Accordingly, implementations of the present disclosure provide a complete end-to-end system (from sensor to screen) that enables users to view, input, transmit, and compute data parameters for remote data aggregation, data management, data visualization of natural resource data (e.g., oil data and/or gas data) from remote production assets, as well as control of remote production assets.

In some implementations methods include actions of generating, by one or more sensors, field data, each sensor of the one or more sensors being responsive to field site activity, transmitting, through a regional network, the field data to a back-end system, processing, by the back-end system, the field data to provide visualization data, transmitting the visualization data to one or more mobile computing devices, and providing a computer-executable application for execution on a mobile computing device, the computer-executable application processing visualization data to provide data visualizations. Other implementations of this aspect include corresponding systems, apparatus, and computer programs, configured to perform the actions of the methods, encoded on computer storage devices.

These and other implementations can each optionally include one or more of the following features: the network includes a play network that provides data acquisition functionality for one or more natural resource plays; the play network includes one or more ultra-low power (ULP) sub-networks, each ULP sub-network including an access point; each ULP sub-network includes one or more communication devices, each communication device enabling data communication between at least one sensor system and the access point; the access point communicates with one or more field site locations within one or more natural resource plays; the access point communicates using a globally certified, license free spectrum; each ULP sub-network communicates with an upper-level network based on one or more of cellular communication and satellite communication; the play network includes one or more wireless sub-networks, each wireless sub-network comprising a gateway; each wireless sub-network includes one or more communication devices, each communication device enabling data communication between a field site component and the gateway; the gateway communicates with one or more field site locations within one or more natural resource plays; each wireless sub-network communicates with an upper-level network based on one or more of cellular communication and satellite communication; a provider of the computer-executable applications is a provider of the regional network; each computer-executable application is operable to receive raw field site data and to process the raw field site data to graphically render one or more data visualizations on a respective mobile computing device; transmitting the visualization data comprises transmitting the visualization data in real-time, the computer-executable application; the one or more sensors include one or more sensors from a group including a temperature sensor, a flow rate sensor, a pressure sensor, a hazardous gas sensor, a fluid-level sensor, a regulated gas sensor, a component integrity sensor, an air quality sensor, an asset tracking sensor (e.g., RFID), and a component failure sensor; actions further include receiving a control signal from a mobile computing device, the control signal being specific to a field site of a natural resource play, and transmitting the control signal to the field site over the regional network, wherein at least one component of the field site is responsive to the control signal; the at least one component includes a valve; the remote well site locations include a first field site operated by a first field operator and a second field site operated by a second field operator, the second field operator being different from the first field operator; field data from each of the first field site and the second field site is transmitted over the regional network to the back-end system; the back-end system transmits respective visualization data to one or more mobile computing devices of the first field operator and one or more mobile computing devices of the second field operator; and actions further include registering a field operator for remote data aggregation, data management, and/or data visualization services, and enabling communication between one or more field sites of the field operator and the regional network.

Other aspects of the present disclosure provide systems including one or more processors, and a computer-readable medium coupled to the one or more processors having instructions stored thereon which, when executed by the one or more processors, cause the one or more processors to perform one or more of the methods provided herein.

It is appreciated that methods in accordance with the present disclosure can include any combination of the aspects and features described herein. That is to say that methods in accordance with the present disclosure are not limited to the combinations of aspects and features specifically described herein, but also include any combination of the aspects and features provided.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to systems and methods for providing end-to-end monitoring and/or control of a plurality of natural resource assets (e.g., oil assets and/or gas assets). Example natural resource assets can include oil well sites, gas well sites. More particularly, implementations of the present disclosure provide one or more play network systems provided by a service provider, in hand with back-end services provided by the service provider. In accordance with implementations of the present disclosure, well data (e.g., oil data and/or gas data) can be retrieved from the one or more play network systems and can be processed by the back-end services on behalf of one or more field site operators, to provide data access, monitoring and/or analytical services to the field site operators. In some examples, well site data, monitoring data and/or analytical data are provided from the service provider to the field site operators (e.g., to computing devices of the field site operators). In some examples, data can be provided to various types of users, or entities. Examples users/entities can include operations personnel, management staff (e.g., of oil/gas companies), executives, investors, mineral owners, service suppliers, and the like. Implementations of the present disclosure further provide mobile applications that can be installed on and executed by mobile computing devices. In some example, site data (e.g., oil data and/or gas data) can be provided to the mobile computing devices, where applications enable rendering of the site data on the native client. In some examples, site data can be provided in real-time. In some examples, rendering of the site data can be provided in real time from raw data (e.g., XML data).

Figure 1:
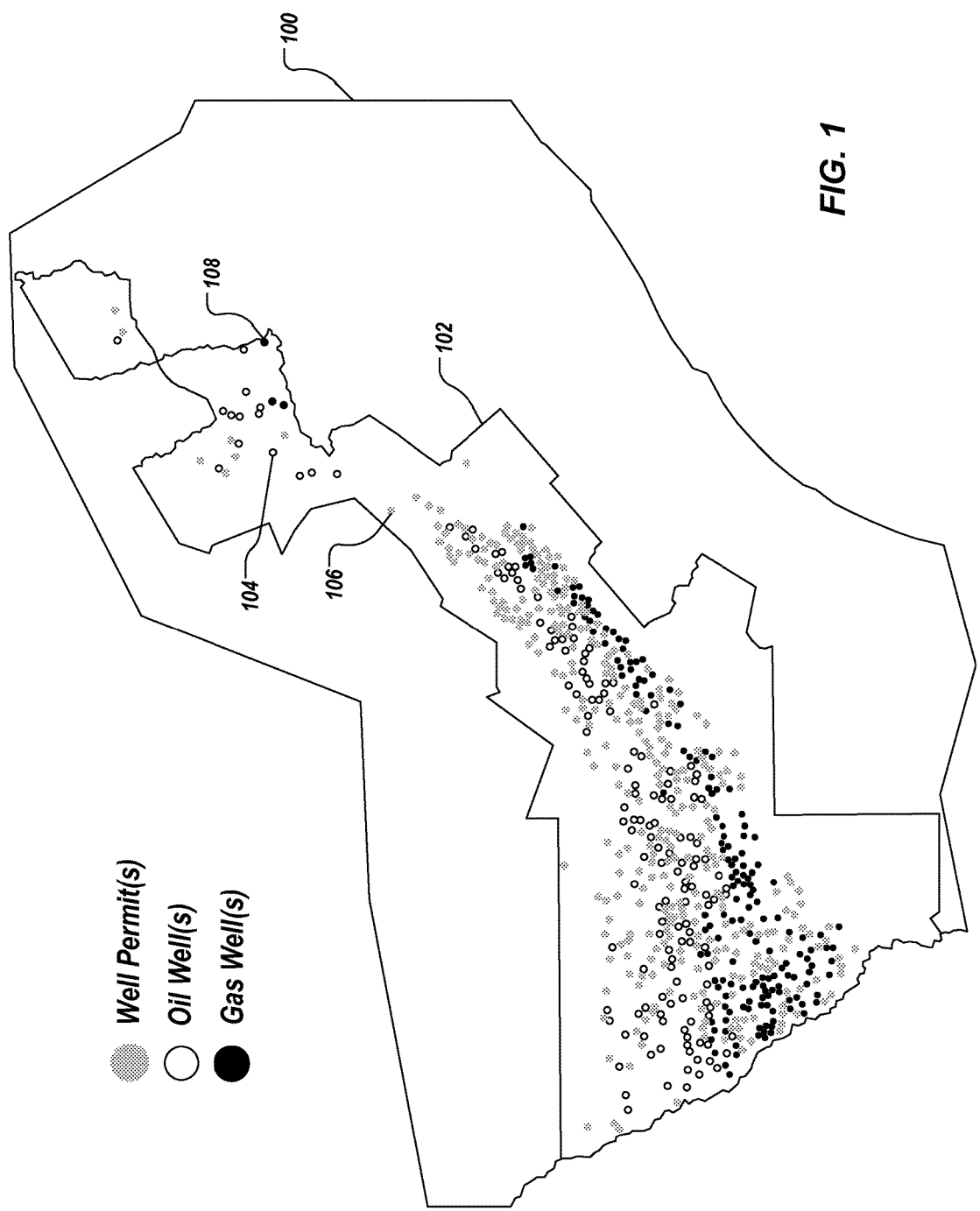
FIG. 1 depicts an example natural resource play.

FIG. 1 depicts an example geographical region 100 including an example natural resource play 102. The natural resource play 102 can be associated with oil and/or natural gas. In general, a natural resource play includes an extent of a petroleum-bearing formation, and/or activities associated with petroleum development in a region. The example geographical region 100 depicts southwestern Texas in the United States, and the example natural resource play 102 depicts the Eagle Ford Shale Play. In the depicted example, the natural resource play 102 is associated with well sites 104, 106, 108. The well sites 104 are each representative of one or more oil and/or natural gas wells that have been permitted, the well sites 106 are each representative of one or more oil wells, and the well sites 108 are each representative of one or more natural gas wells. The example of FIG. 1 is an approximation of the well sites 104, 106, 108 of the Eagle Ford Shale Play as of December 2011.

The example of FIG. 1 is provided as an illustration of well activity and well growth in an example natural resource play (e.g., the natural resource play 102). As depicted, well sites can be spread across an expansive region and can be located in remote areas. This can make well site monitoring and access to well data difficult. Further, rapid growth of well sites, particularly in remote areas, can further complicate well monitoring and access to well data.

As introduced above, implementations of the present disclosure are directed to a system architecture that enables end-to-end monitoring of a plurality of well sites. Implementations of the present disclosure include features of well data acquisition and monitoring, software and well data as a service, and custom analysis and applications. In accordance with the present disclosure, these features are provided in a secure and reliable manner, improve hydrocarbon production, improve operational efficiency of well operators, improve safety of operations for field personnel, improve regulatory compliance, and provide overall cost savings in well operations. More particularly, and as discussed in further detail herein, the system architecture includes one or more proprietary play networks that receive well data from well sites within one or more natural resource plays. In some examples, and as discussed in further detail herein, a play network can include transmitting/receiving devices, one or more sensors and/or control devices that are deployed in the field, and can be owned/operated by the provider of the play network. The one or more play networks provide well data to one or more back-end systems that store the well data. In some examples, a back-end system can process the well data to provide auxiliary data. In some examples, the well data and/or the auxiliary data can be provided to one or more computing devices. In some examples, computing devices include computing devices owned and operated by one or more well site operators. In some examples, computing devices can be provided as mobile computing devices. In accordance with implementations of the present disclosure, one or more data visualizations can be displayed on a mobile computing device, enabling a user (e.g., an employee of a well operator) to monitor one or more wells of one or more natural resource plays.

Implementations of the present disclosure provide a broad landscape for well site monitoring and control. In some examples, and as discussed in further detail herein, implementations of the present disclosure provide cellular data access, satellite data access, private data networks, ultra-low power (ULP) networks, a mobile platform, an analytics platform, customizable reports, alarms and alerting, remote control, remote terminal unit (RTU) controllers, and a cloud-based solution for well data access and monitoring.

Figure 2:
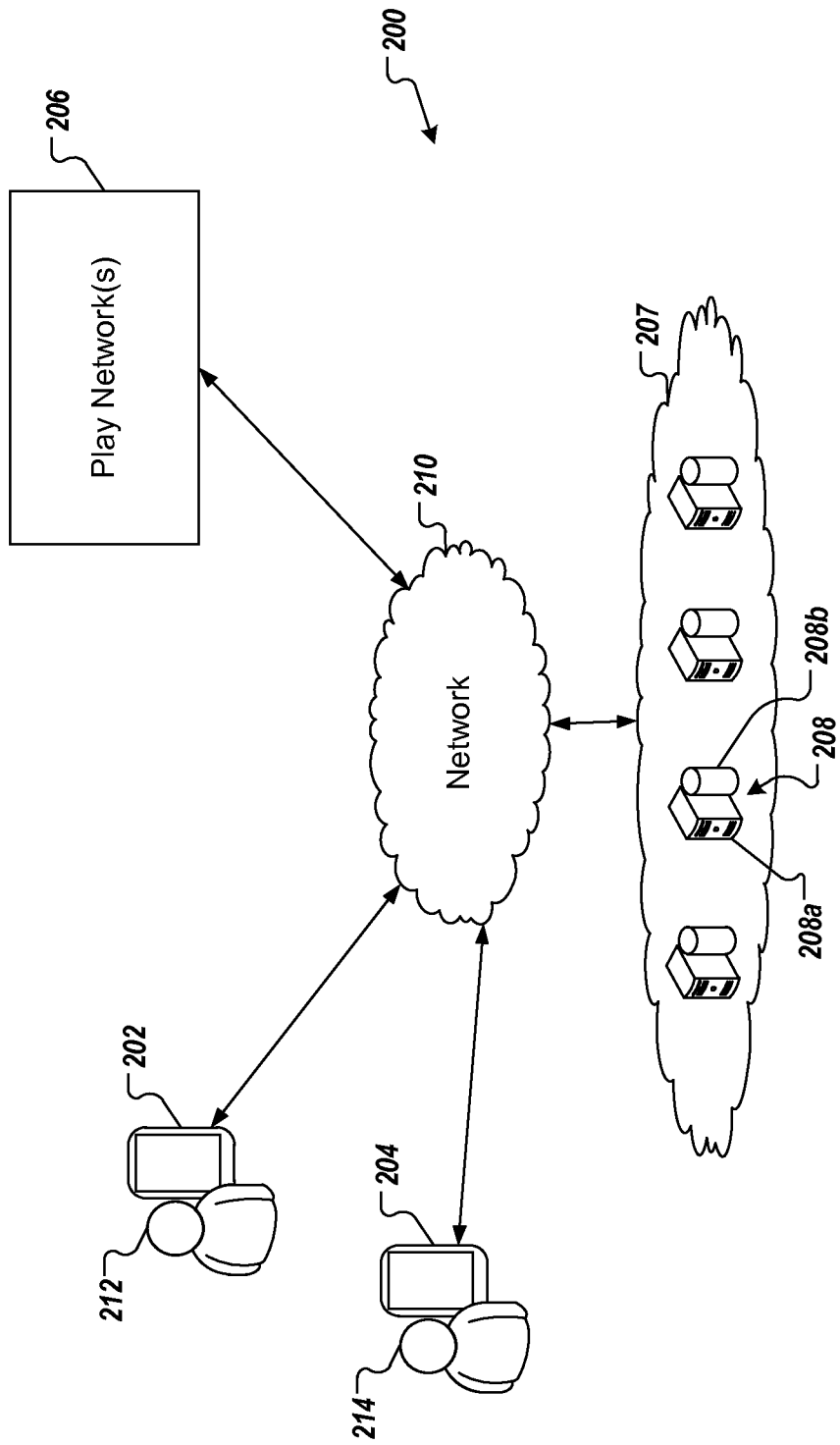
FIG. 2 depicts an example system in accordance with implementations of the present disclosure.

FIG. 2 depicts an example system 200 that can execute implementations of the present disclosure. The example system 200 includes one or more computing devices, such as computing devices 202, 204, one or more play networks 206, and a computing cloud 207 that includes one or more computing systems 208. The example system 200 further includes a network 210. The network 210 can include a large computer network, such as a local area network (LAN), wide area network (WAN), the Internet, a cellular network, a satellite network, one or more wireless access points, or a combination thereof connecting any number of mobile clients, fixed clients, and servers. In some examples, the network 210 can be referred to as an upper-level network.

The computing devices 202, 204 are associated with respective users 212, 214. In some examples, the computing devices 202, 204 can each include various forms of a processing device including, but not limited to, a desktop computer, a laptop computer, a tablet computer, a wearable computer, a handheld computer, a personal digital assistant (PDA), a cellular telephone, a network appliance, a smart phone, an enhanced general packet radio service (EGPRS) mobile phone, or an appropriate combination of any two or more of these example data processing devices or other data processing devices. The computing systems 208 each include a computing device 208a and computer-readable memory provided as a persistent storage device 208b, and can represent various forms of server systems including, but not limited to a web server, an application server, a proxy server, a network server, or a server farm.

In some implementations, and as discussed in further detail herein, site data (e.g., oil data and/or gas data) can be communicated from one or more of the play networks 206 to the computing systems 208 over the network 210. In some examples, each play network 206 can be provided as a regional network. For example, a play network can be associated with one or more plays within a geographical region. In some examples, each play network 206 includes one or more sub-networks. As discussed in further detail herein, example sub-networks can include a ULP sub-network, and one or more wireless sub-networks.

In some examples, the computing systems 208 store the well data and/or process the well data to provide auxiliary data. In some examples, the well data and/or the auxiliary data are communicated over the play network(s) 206 and the network 210 to the computing devices 202, 204 for display thereon. In some examples, user input to the computing devices 202, 204 can be communicated to the computing systems 208 over the network 210.

In general, monitoring of well sites can include oil well monitoring and natural gas well monitoring (e.g., pressure(s), temperature(s), flow rate(s)), compressor monitoring (e.g., pressure, temperature), flow measurement (e.g., flow rate), custody transfer, tank level monitoring, hazardous gas detection, remote shut-in, water monitoring, cathodic protection sensing, asset tracking, water monitoring, access monitoring, and valve monitoring. In some examples, control capabilities can be provide, such as remote valve control, remote start/stop capabilities, remote access control.

Figure 3:
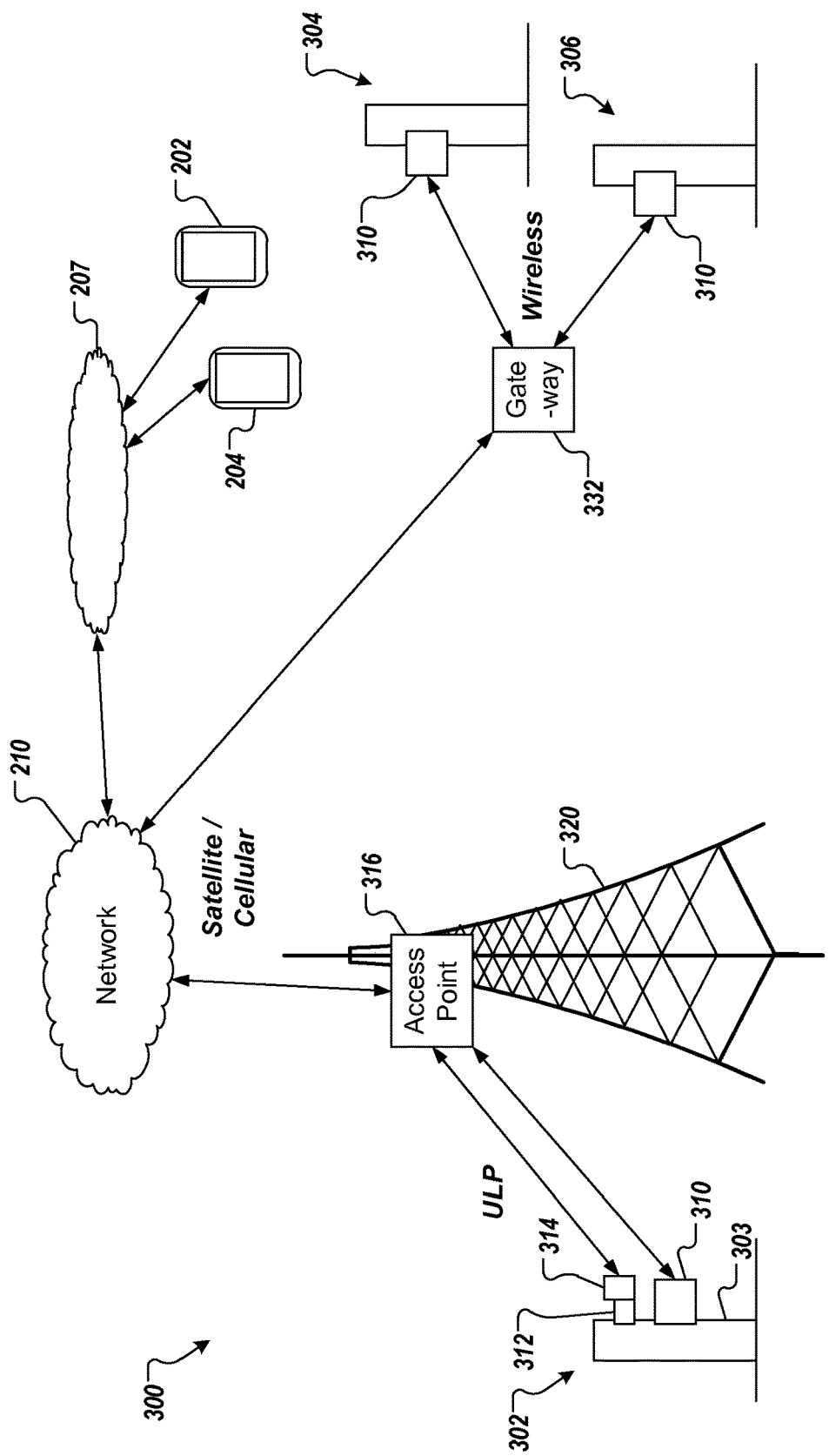
FIG. 3 depicts an example portion of a play network.

FIG. 3 depicts an example portion of an example play network 300. The example play network 300 provides ULP communication, and cellular and/or satellite communication for well data access and/or control. In the example of FIG. 3, a first well site 302, a second well site 304 and a third well site 306 are depicted. Although three well sites are depicted, it is appreciated that the example play network 300 can include any appropriate number of well sites. In the example of FIG. 3, well monitoring and data access for the well site 302 is provided using ULP communication and cellular and/or satellite communication, and well monitoring and data access for the well sites 304, 306 is provided using cellular and/or satellite communication.

In the depicted example, the well site 302 includes a wellhead 303, a sensor system 310, a sensor system 312 and communication device 314. In some examples, the sensor system 310 includes a wireless communication device that is connected to one or more sensors, the one or more sensors monitoring parameters associated with operation of the wellhead 303. In some examples, the wireless communication device enables monitoring of discrete and analog signals directly from the connected sensors and/or other signaling devices. In some examples, the sensor system 310 can provide control functionality (e.g., valve control). Although a single sensor system 310 is depicted, it is contemplated that a well site can include any appropriate number of sensor systems 310. In some examples, the sensor system 312 includes one or more sensors that monitor parameters associated with operation of the wellhead 303. In some examples, the sensor system 312 generates data signals that are provided to the communication device 314, which can forward the data signals. Although a single sensor system 312 and communication device 314 are depicted, it is contemplated that a well site can include any appropriate number of sensor systems 312 and/or communication devices 314.

Well data and/or control commands can be provided to/from the well site 302 through an access point 316. More particularly, information can be transmitted between the access point 316, and the sensor system 310 and/or the communication device 314 based on ULP. In some examples, ULP provides communication using a globally certified, license free spectrum (e.g., 2.4 GHz). In some examples, the access point 316 provides a radial coverage that enables the access point 316 to communicate with numerous well sites, such as the well site 302. In some examples, the access point 316 further communicates with the network 210 using cellular, satellite, point-to-point, point-to-multipoint radios, and/or terrestrial or wired communication.

In the depicted example, the access point 316 is mounted on a tower 320. In some examples, the tower 320 can include an existing telecommunications or other tower. In some examples, an existing tower can support multiple functionalities. In this manner, erection of a tower specific to one or more well sites is not required. In some examples, one or more dedicated towers could be erected.

In the depicted example, the well sites 304, 306 include respective wellheads 305, 307, and respective sensor systems 310 (discussed above). Although a single sensor system 310 is depicted for each well site 304, 306, it is contemplated that a well site can include any appropriate number of sensor systems 310. In some examples, well data and/or control commands can be provided to/from the well sites 302 through a gateway 332. More particularly, information can be transmitted between the gateway 332, and the sensor systems 310 can be wireless communication (e.g., radio frequency (RF)). In some examples, the gateway 332 further communicates with the network 210 using cellular and/or satellite communication.

In accordance with implementations of the present disclosure, well site control and/or data visualization and/or analysis functionality (e.g., hosted in the computing cloud 207 of FIGS. 2 and 3) and one or more play networks (e.g., the play networks 206, 300 of FIGS. 2 and 3) can be provided by a service provider. In some examples, the service provider provides end-to-end services for a plurality of well sites. In some examples, the service provider owns the one or more play networks and enables well site operators to use the play networks and control/visualization/monitoring functionality provided by the service provider. For example, a well site operator can operate a plurality of well sites. The well site operator can engage the service provider for well site control/visualization/monitoring services (e.g., subscribe for services). In some examples, the service provider and/or the well site operator can install appropriate sensor systems, communication devices and/or gateways (e.g., as discussed above with reference to FIG. 3). In some examples, sensor systems, communication devices and/or gateways can be provided as end-points that are unique to the well site operator.

In some implementations, the service provider can maintain one or more indices of end-points and well site operators. In some examples, the index can map data received from one or more end-points to computing devices associated with one or more well site operators. In some examples, well site operators can include internal server systems and/or computing devices that can receive well data and/or auxiliary data from the service provider. In some examples, the service provider can receive messages from well sites, the messages can include, for example, well data and an end-point identifier. In some examples, the service provider can route messages and/or auxiliary data generated by the server provider (e.g., analytical data) to the appropriate well site operator or personnel based on the end-point identifier and the index. Similarly, the service provider can route messages (e.g., control messages) from a well site operator to one or more appropriate well sites.

In some examples, an index can map messages between end-points and specific computing devices associated with a well site operator. For example, a well site operator can include a field supervisor that is responsible for overall operation of a plurality of well sites across a relatively large region (e.g., regional level). Consequently, well data and/or auxiliary data associated with all of the well sites across the large region can be provided to a computing device (e.g., a mobile computing device) associated with the field supervisor. As another example, a well site operator can include a field technician that is responsible for visiting and keep track of a sub-set of well sites across a relatively small region (e.g., local level). Consequently, well data and/or auxiliary data associated with only those well sites within the sub-set of well sites can be provided to a computing device (e.g., a mobile computing device) associated with the field technician. In these examples, the field supervisor is provided with a regional view of well site operations, while the field technician is provided with a local view of well site operations. As another example, a field supervisor can be provided with a higher-level of control commands that can be issued to a well site from the computing device, as opposed to a field technician.

In some examples, data can be provided to various types of users or entities associated with field sites. Example users/entities can include operations managers (e.g., in remote locations), executives and/or owners of a business, department personnel (e.g., information technology (IT), accounting, engineering, etc). In general, implementations of the present disclosure, provide for one source of truth from ground (e.g., field sites) to glass (e.g., displays of computing devices) across all users or entities associated with natural resource extraction/production efforts. For example, data can be provided to investors in an oil and/or gas production or infrastructure play. As another example, data can also be provided to mineral-rights owners and/or land owners and their personnel, providing complete visibility of the production of hydrocarbons and activities on their land.

As introduced above, implementations of the present disclosure provide robust security. In some examples, security is provided through mutual entity authentication, message authentication, message confidentiality, limited anonymity, firmware authentication and/or non-repudiation. In some examples, mutual entity authentication is provided such that only authenticated users and/or devices can access a valid network (e.g., the natural play network(s) 206 and/or the network 210 of FIG. 2), and only valid monitoring devices (e.g., at a well site) are able to communicate with the valid network. In some examples, message authentication is provided using cipher-based message authentication code (CMAC) using 128-bit encryption to provide immunity to replay attacks. It is contemplated that other appropriate message authentication schema can be implemented. In some implementations, message confidentiality can be provided based on message encryption. In some examples, message encryption can include triple DES (three key) encryption at the communication layer, and AES-128 encryption at the device layer. It is contemplated that other appropriate encryption techniques can be implemented. In some implementations, limited anonymity can be provided by the communication link not disclosing the identity of end-points communicating with one another. In some implementations, firmware authentication is provided in that only node and/or host firmware can be upgraded by a valid network. In some implementations, non-repudiation is provided using proof of origin of data.

In accordance with implementations of the present disclosure, and as discussed in further detail herein, data is provided to users/entities in a secure manner. In some examples, retrieved data can be fire-walled at the cloud level (e.g., within the computing cloud 207 of FIG. 2) and secured on a per entity basis (e.g., per company basis), and/or per user basis. In some examples, data that has been captured remotely can be stored on-premise (e.g., in a storage device associated with one or more field sites of an operator) and/or in the cloud (e.g., in the computing cloud 207 of FIG. 2). In some examples, such data can be securely delivered to appropriate end-point devices (e.g., fixed computing devices, mobile computing devices) using secure communications.

Figure 4:
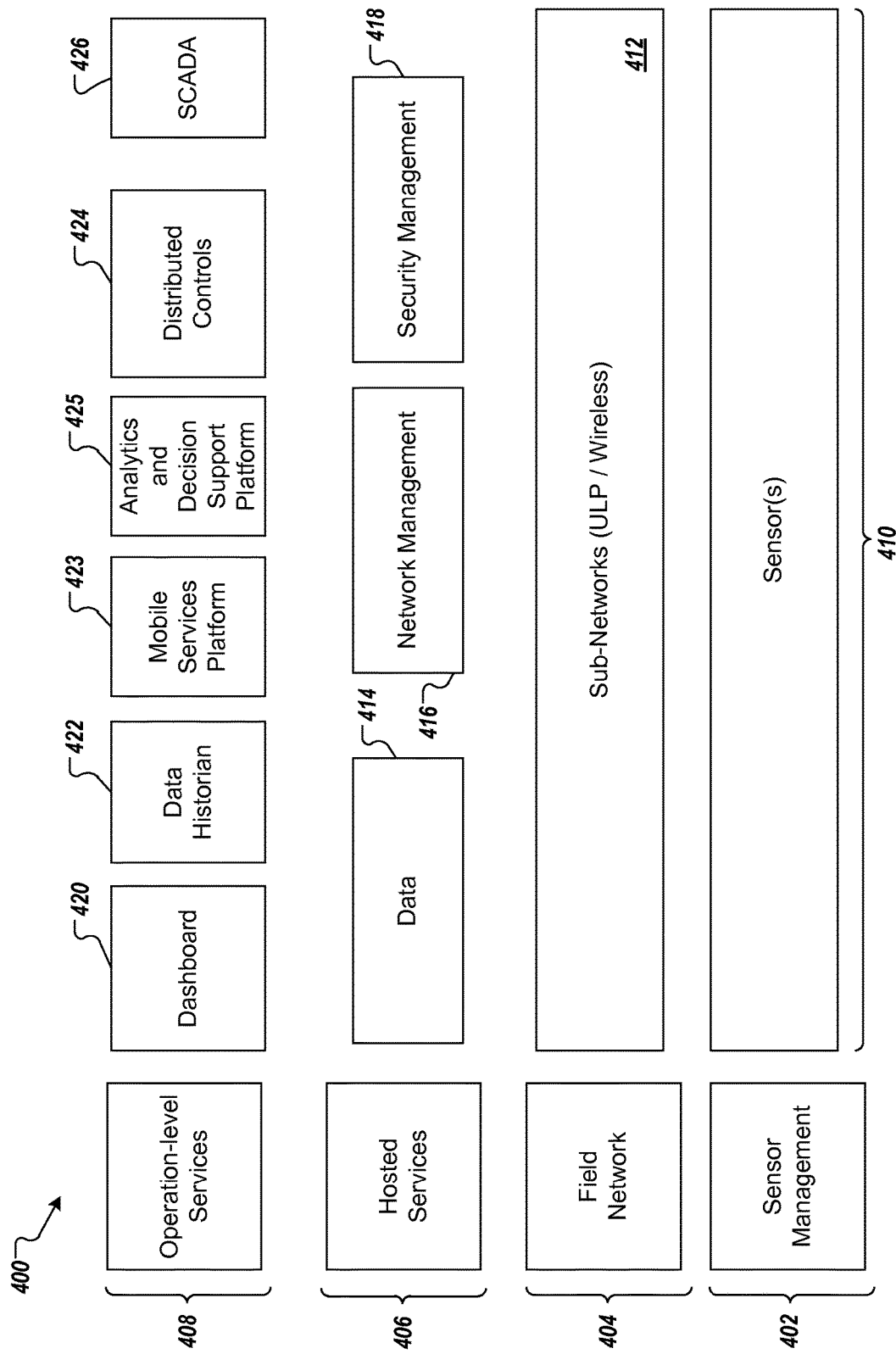
FIG. 4 depicts an example service platform in accordance with implementations of the present disclosure.

FIG. 4 depicts an example services platform 400 in accordance with implementations of the present disclosure. In the depicted example, the example services platform 400 includes ULP services. The example service platform 400 includes sensor management services 402, field network services 404, hosted network services 406, and operations and information services 408. In some examples, the sensor management services 402 provide well site-level management of sensors 410 that monitor well activity and that generate well data. In some implementations, the following example functionality is provided: mobile monitoring and control of remote assets, remote monitoring of production, remote spill/leak detection, remote well shut in, remote measurement of various elements including, but not limited to, hydrocarbon production, salt water production, fresh water production/consumption, tank level monitoring, hazardous gas detection, regulated gas detection, pipeline integrity monitoring, remote pipeline shut in and control, block valve control, production optimization through closed loop control, hydrocarbon reservoir optimization through closed loop control, pressure monitoring, temperature monitoring, air quality monitoring, asset tracking, personnel access control, monitoring and control of removal of hydrocarbons, and/or detection of equipment failure and remote restart capabilities In some examples, the field network management services 404 provide play network-level services for access points 412 (e.g., access point 316 of FIG. 3). In some examples, network management services can include: provisioning and management/control of remote sensors, provisioning and management/control of remote monitoring and/or computing devices, provisioning and remote management/control of transmitting devices, providing alarms and alerts, remotely controlling various assets, collecting data from sensors, making computational decisions to present to field operators, collecting data from sensors and making computational decisions to remotely control field assets, and/or storage and delivery of data captured remotely from the field. In general, network management services of the present disclosure provide a complete end-to-end system to acquire, compile, store, and present data and information.

In some examples, the hosted network services 408 include data services 414, network management services 416, and security management services 418. In some examples, data services can include capturing and storing data acquired from remote field assets. In some examples, network management services can include reading and/or performing computations on the captured data, and/or initiating appropriate actions. Example actions can include: alerting, informing, controlling, and the like. In some examples, security management services include spill and/or hazardous condition detection, alerting, and control. In some examples, security management services can include the monitoring and assurance that data is not shared with or acquired by unauthorized entities (e.g., malicious users).

In some examples, the operations and information services 410 include a digital dashboard services 420, data historian services 422, a mobile services platform 423, distributed control system services 424, an analytics and decision support platform 425, and supervisory control and data acquisition (SCADA) services 426. In some examples, the digital dashboard services 420 provide data visualizations for individual well sites, a field of well sites, a natural resource play, and/or multiple natural resource plays. In some examples, the data visualizations can provide visualizations associated with one or more sensors and can enable drill-down to specific sensors. In some examples, the digital dashboard services 420 enable users to set and/or update user-configurable read and update intervals (e.g., intervals at which data is retrieved from respective sensors and/or types of sensors). In some examples, the digital dashboard services 420 enable users to view alarms (e.g., on a displayed dashboard, email and/or SMS/MMS messages). Example alarms can include threshold alarms (e.g., a monitored parameter has exceeded an established threshold), state change alarms, and low battery alarms. In some examples, the digital dashboard services 420 enable users to integrate data feed through web service interfaces. In some examples, data historian services 422 can include the ability of a computer or server to store, file, compress, compile data acquired from field assets, and to provide that information to an inquiring computer device and/or software program. In some examples, this service can be offered over a variable amount of time depending on service level agreements (SLAs). In some examples, digital control services 424 can include remote control of field assets through data acquired and computational analysis performed. In some examples, these services can include remote start/stop, remote valve control, remote gate control or access, and/or remote alert or alarming. In some examples, supervisory control and data acquisition systems (SCADA) 426 services can include remote monitoring and control of field assets such as flow rate, temperature, pressure, level, and/or on/off. In some examples, these services can be performed by a computing device with a computer program that determines which of such monitoring and control should occur, in a remote monitoring network operating center by personnel monitoring certain data and assets, and/or by field personnel in a mobile monitoring and control environment, such as a well site location, for example.

As discussed above, the service provider can provide well data and/or auxiliary data to computing devices of well site operators. In some examples, the auxiliary data can include visualization data and/or analytical data. For example, and as part of a subscription process, computer-executable programs provided by the service provider can be downloaded to and installed on computing devices of the well site operator. As one example, an employee of the well site operator (e.g., a field supervisor, a field technician) can download and install a mobile application to a mobile computing device (e.g., a smart phone, a tablet). In some examples, the service provider can route well data and/or auxiliary data to the mobile computing device. In some examples, well data, alerts, alarms, and/or data visualizations are displayed on the mobile computing device using the mobile application. In some examples, well data, alerts, alarms, and/or data visualizations can be provided using web portals (e.g., in a web browser executed on a desktop computing device).

As noted above, the service provider can provide data visualization and/or data analysis services. In some example, the service provider can process well data (e.g., using computing cloud 207 of FIGS. 2 and 3), to generate data visualizations. In some examples, data visualizations can include graphs. An example graph can include trend graphs that visually depict changes in parameter values over time. In some examples, data visualizations can include tables. In some examples, data visualizations can include waveforms. In some examples, data visualization can include reporting functions and reports generated. The data visualization system can include multiple layers and architectures that enable a user to look at various data and detail that is optimized for display/viewing. In some examples, displayed data can be manipulated by the user. For example, users are able to scroll data visualizations (e.g., graphs, tables, waveforms) to view additional data, and/or zoom in/out of data visualizations to provide more detailed or more abstract data views. In some examples, data visualizations can include historical data and/or trends. In some examples, data visualizations can include real-time data as data is received from field sites, and/or real-time trends as trend data is computed based as data is received from field sites.

In some examples, users can input appropriate data using fixed (e.g., desktop) and/or mobile devices (e.g., smart phone, tablet) to improve functionality discussed herein. For example, a field technician using a computing device executing applications in accordance with the present disclosure can be provided the ability to take pictures of field assets, store the images, note latitude, longitude and/or altitude locations, input necessary notes of assets including inventory, model numbers, specifications, input schematics and functional descriptions and/or flow diagrams relating to various field assets and equipment.

In some examples, the service provider can provide planning and/or workflow services. For example, a field technician can be responsible for periodic (e.g., daily, weekly, monthly) visits to well sites, and to perform one or more tasks during a visit. In some examples, the service provider can process well data to define a visitation schedule. In some examples, a visitation schedule can define an order in which well sites are to be visited by the field technician. In some examples, the order can be defined based on a rules engine that processes the well data and/or auxiliary data. For example, a first well site can include one or more parameters that exceed respective threshold, and a second well site can include one or more parameters within an acceptable range. Consequently, the visitation schedule can provide that the first well site is to be visited first and the second well site to be visited second (e.g., which could be contrary to the field technician's personal plan). In some examples, the planning services can include confirmation of well site visits. For example, when a field technician (e.g., the mobile device used by the field technician) is determined to be present at the well site, a signal can be provided to the service provider that the visit has indeed occurred.

In some implementations, workflow services can be provided. In some examples, workflow services can include providing a workflow that can be executed by a field technician during a visit to a well site. In some example, a workflow can include one or more tasks to be performed by the field technician. In some examples, a workflow can be defined based on a rules engine that processes the well data and/or auxiliary data. For example, a well site can include a plurality of parameters that exceed respective thresholds. In some examples, the workflow can include tasks and/or an order of tasks based on the plurality of parameters (e.g., tasks ordered based severity of exceeding the thresholds, type of parameter).

Figure 5:
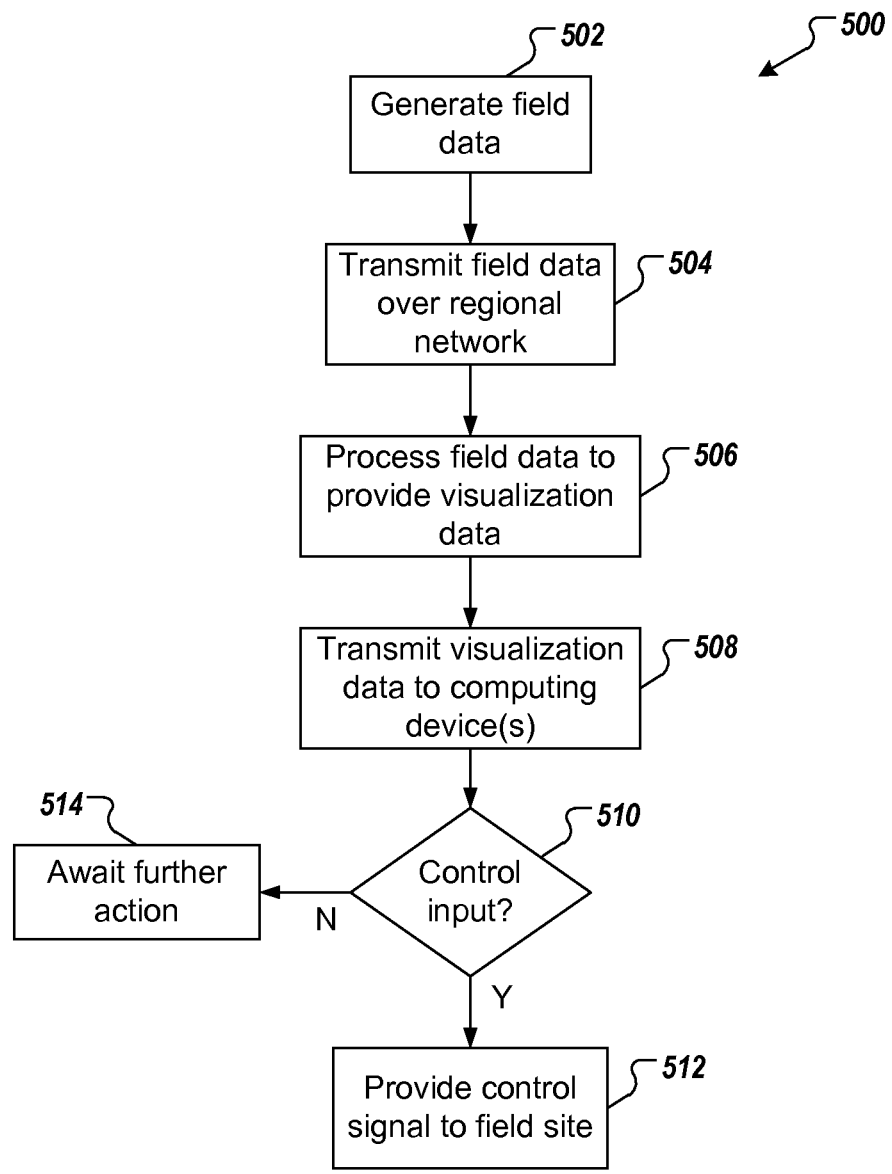
FIG. 5 depicts an example process that can be executed in accordance with implementations of the present disclosure.

FIG. 5 depicts an example process 500 that can be executed in accordance with implementations of the present disclosure. In some examples, the example process 500 can be provided using one or more computer-executable programs that are executed using one or more computing devices.

Field data is generated (502). For example, one or more sensors at a field site can be responsive to activity associated with a field site component and can generate field data based on such activity. The field data is transmitted over a regional network (504). In some examples, the field data is transmitted over the regional network to a back-end system. In some examples, the regional network includes one or more sub-networks that enable data transmission in various manners. Example sub-networks include ULP sub-networks and wireless sub-networks.

The field data is processed to provide visualization data (506). In some examples, the back-end system processes the field data to provide the visualization data. The visualization data is transmitted to one or more computing devices (508). Example computing devices can include mobile computing devices (e.g., smart phones, tablets). In some examples, the computing devices each execute a native client application for displaying data visualizations based on the visualization data, and enable user manipulation of the data visualizations. For example, users are able to scroll data visualizations (e.g., graphs, tables, waveforms) to view additional data, and/or zoom in/out of data visualizations to provide more detailed or more abstract data views. In some examples, data visualizations can include historical data and/or trends. In some examples, data visualizations can include real-time data as data is received from field sites, and/or real-time trends as trend data is computed based as data is received from field sites.

It is determined whether a control input is received (510). In some examples, a user of a computing device can provide user input that is processed by the native client application, the user input indicating a control command for remote control of a field component of a field site. In some examples, the control input is received by the back-end system. In some examples, the back-end system determines, which field site and which field component the control input is directed to. If it is determined that a control input is received, the control input is transmitted to the appropriate field site (512). In some examples, the back-end system transmits the control input to the appropriate field site over the regional network. If it is determined that a control input has not been received, the system waits for further action. Example actions can include the generation of additional field data that is to be provided to computing devices, user requests for field data and/or data visualizations, and/or control inputs.

Figure 6:
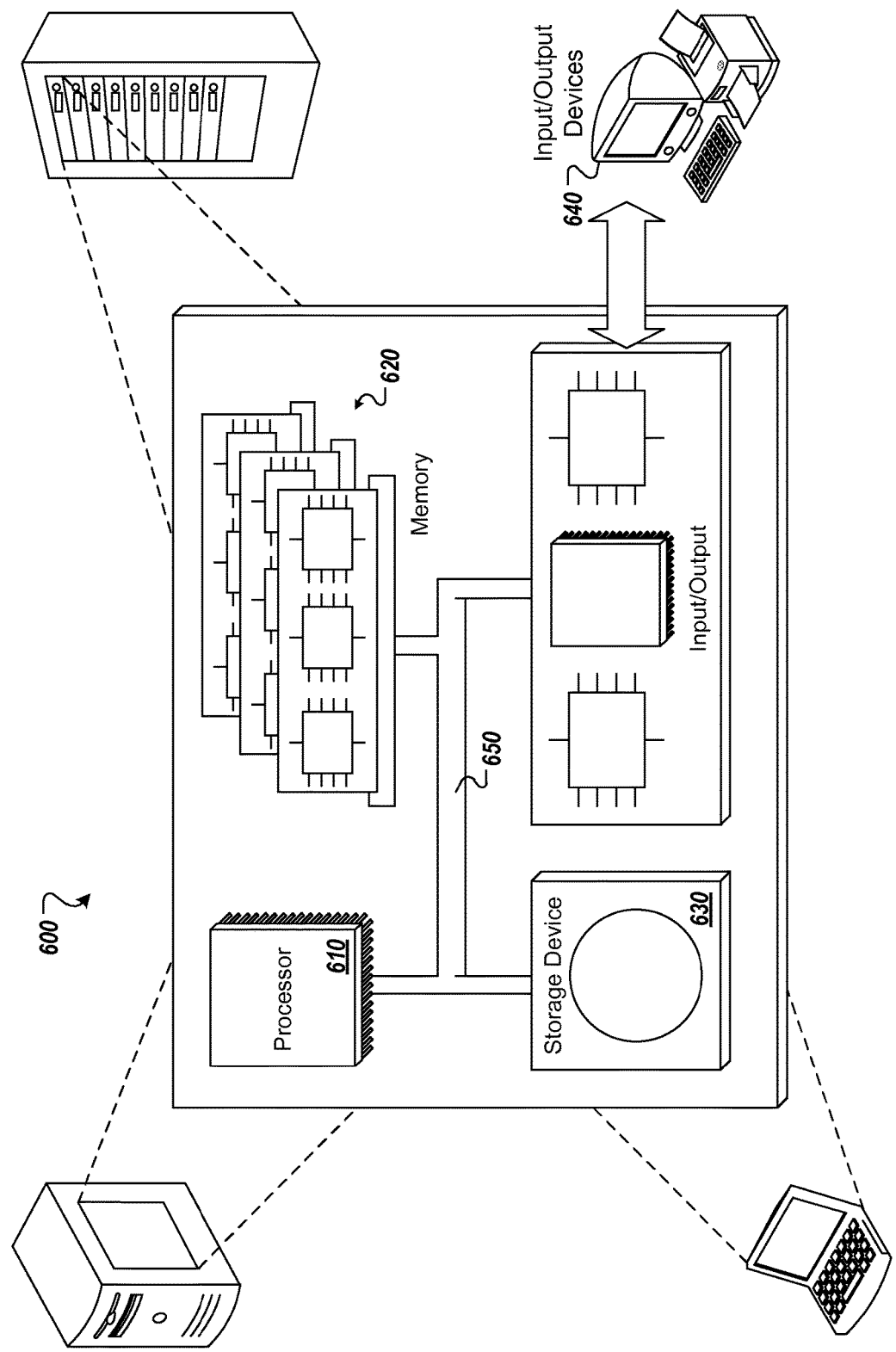
FIG. 6 is a schematic illustration of example computer systems that can be used to execute implementations of the present disclosure.

Referring now to FIG. 6, a schematic diagram of example computing systems 600 is provided. The example system 600 can be used for the operations described in association with the implementations described herein. For example, the system 600 may be included in any or all of the server components discussed herein. The system 600 includes a processor 610, a memory 620, a storage device 630, and an input/output device 640. Each of the components 610, 620, 630, 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit. The storage device 630 is capable of providing mass storage for the system 600. In one implementation, the storage device 630 is a computer-readable medium. In various different implementations, the storage device 630 may be a floppy disk device, a hard disk device, an optical disk device, or a tape device. The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor receives instructions and data from a read-only memory or a random access memory or both. The essential elements of a computer are a processor for executing instructions and one or more memories for storing instructions and data. Generally, a computer also includes, or is operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for remote data aggregation, data management, and data visualization of field data from remote field site locations, the method being executed using one or more processors and comprising:
    transmitting, through a first regional network to a back-end system,
    first field data received from a first set of sensors that are responsive to field site activity at a first well-site, of a group of well-sites;
    transmitting, through a second regional network to the back-end system, second field data received from a second set of sensors that are responsive to field site activity at a second well-site of the group of well-sites;
    processing, by the back-end system, the first field data to provide first visualization data associated with the first well-site;
    processing, by the back-end system, the second field data to provide second visualization data associated with the second well-site;
    identifying, by the back-end system, a first computing device associated with an operator of the first well-site and a second computing device associated with an operator of the second well-site;
    providing, for display, the first visualization data to the first computing device and the second visualization data to the second computing device;
    receiving, from the first computing device, a control signal to remotely operate an asset at the group of well-sites; and
    transmitting, by the back-end system, the control signal to the asset at the group of well-sites;
    wherein the first visualization data provides data for a local view and the second visualization data provides data for a regional view, the local view being part of the regional view.

2. The method of claim 1, wherein the first regional network is a play network that provides data acquisition functionality for the first well-site, wherein the first well-site comprises an industrial site for extracting natural resources and the play network comprises a network of sensors coupled to equipment at the industrial site.

3. The method of claim 2, wherein the play network comprises one or more sub-networks, each sub-network comprising an access point.

4. The method of claim 3, wherein each sub-network comprises one or more communication devices, each communication device enabling data communication between at least one sensor system and the access point.

5. The method of claim 3, wherein each sub-network communicates with an upper-level network based on one or more of cellular communication and satellite communication.

6. The method of claim 2, wherein the play network comprises one or more wireless sub-networks, each wireless sub-network comprising a gateway.

7. The method of claim 1, wherein the one or more sensors comprise one or more sensors from a group comprising a temperature sensor, a flow rate sensor, a pressure sensor, a hazardous gas sensor, a fluid-level sensor, a regulated gas sensor, a component integrity sensor, an air quality sensor, an asset tracking sensor (e.g., RFID), and a component failure sensor.

8. The method of claim 1, further comprising identifying, by the back-end system, a particular well-site where the asset is located,
wherein the control signal is being transmitted to the particular well-site, and
wherein at least one component of the particular well-site is responsive to the control signal.

9. The method of claim 8, wherein the particular well-site is identified from an index that maps the first computing device to one or more assets, each asset of the one or more assets being at a well-site of the group of well-sites.

10. The method of claim 1, wherein the first computing device and the second computing device are identified from an index, the index is configured to map data received from one or more well-site sensors to computing devices associated with one or more well-site operators.

11. The method of claim 10, wherein the index comprises of one or more control levels associated with the one or more well-site operators, wherein the first visualization data is provided at least partly based on a control level of the operator of the first well-site.

12. A non-transitory computer-readable storage medium coupled to one or more processors and having instructions stored thereon which, when executed by the one or more processors, cause the one or more processors to perform operations comprising:
receiving first field data from a first set of sensors through a first regional network, the first field data being generated by the first set of sensors responsive to field site activity at a first well-site;
receiving through a second regional network second field data from a second set of sensors that are responsive to field site activity at a second well-site;
processing the first field data to provide first visualization data associated with the first well-site;
processing the second field data to provide second visualization data associated with the second well-site;
identifying a first computing device associated with an operator of the first well-site and a second computing device associated with an operator of the second well-site;
providing, for display, the first visualization data to the first computing device and the second visualization data to the second computing device;
receiving, from the first computing device, a control signal to remotely operate an asset at the first well-site; and
transmitting the control signal to the asset at the first well-site.

13. The computer-readable storage medium of claim 12, wherein the first regional network is a play network that provides data acquisition functionality for the first well-site, wherein the first well-site comprises an industrial site for extracting natural resources and the play network comprises a network of sensors coupled to equipment at the industrial site.

14. The computer-readable storage medium of claim 13, wherein the play network comprises one or more sub-networks, each sub-network comprising an access point.

15. The computer-readable storage medium of claim 14, wherein each sub-network comprises one or more communication devices, each communication device enabling data communication between at least one sensor system and the access point.

16. A system, comprising:
one or more processors; and
a non-transitory computer-readable storage medium in communication with the one or more processors and having instructions stored thereon which, when executed by the one or more processors, cause the one or more processors to perform operations comprising:
receiving, first field data from a first set of sensors through a first regional network, the first field data being, generated by the first set of sensors, responsive to field site activity at a first well-site;
receiving through a second regional network second field data from a second set of sensors that are responsive to field site activity at a second well-site;
processing, the first field data to provide first visualization data associated with the first well-site;
processing the second field data to provide second visualization data associated with the second well-site;
identifying a first computing device associated with an operator of the first well-site and a second computing device associated with an operator of the second well-site;
providing, for display, the first visualization data to the first computing device and the second visualization data to the second computing device;
receiving, from the first computing device, a control signal to remotely operate an asset at the first well-site; and
transmitting the control signal to the asset at the first well-site.

17. The system of claim 16, wherein the first regional network is a play network that provides data acquisition functionality for the first well-site, wherein the first well-site comprises an industrial site for extracting natural resources and the play network comprises a network of sensors coupled to equipment at the industrial site.

18. The system of claim 17, wherein the play network comprises one or more sub-networks, each sub-network comprising an access point.

19. The system of claim 18, wherein each sub-network comprises one or more communication devices, each communication device enabling data communication between at least one sensor system and the access point.

20. The system of claim 18, wherein each sub-network communicates with an upper-level network based on one or more of cellular communication and satellite communication.

* * * * *

UNITED STATES PATENT AND TRADEMARK OFFICE
CERTIFICATE OF CORRECTION

PATENT NO. : 10,100,629 B2
APPLICATION NO. : 14/770917
DATED : October 16, 2018
INVENTOR(S) : Matthew Harrison, William Cameron Powell and Stephen Trey Moore Page 1 of 1

It is certified that error appears in the above-identified patent and that said Letters Patent is hereby corrected as shown below:

In the Claims

Column 16, Line 22, Claim 16, delete "receiving," and insert -- receiving --, therefore.

Column 16, Line 24, Claim 16, delete "being," and insert -- being --, therefore.

Column 16, Line 29, Claim 16, delete "processing," and insert -- processing --, therefore.

Signed and Sealed this
Twenty-fifth Day of December, 2018

Andrei Iancu
*Director of the United States Patent and Trademark Office*